United States Patent [19]

Haruhara

[11] Patent Number: 4,744,097

[45] Date of Patent: May 10, 1988

[54] DATA TRANSMISSION SYSTEM

[75] Inventor: Kazuyoshi Haruhara, Tokyo, Japan

[73] Assignee: Casio Computer Co., Ltd., Tokyo, Japan

[21] Appl. No.: 907,678

[22] Filed: Sep. 15, 1986

[30] Foreign Application Priority Data

Sep. 20, 1985 [JP] Japan ................................ 60-208303

[51] Int. Cl.[4] ......................... H04B 1/38; G06F 11/00

[52] U.S. Cl. .................................... 375/7; 340/825.15; 371/66; 365/228; 375/37

[58] Field of Search ...................... 375/3, 4, 7, 58, 118, 375/36, 37, 108, 109; 340/825.15, 825.44; 455/18; 371/10, 66; 365/228, 229

[56] References Cited

U.S. PATENT DOCUMENTS

| | | | |
|---|---|---|---|
| T932,005 | 3/1975 | Kruskal | 371/10 |
| 4,051,461 | 9/1977 | Hashimoto et al. | 371/10 |
| 4,271,518 | 6/1981 | Birzele et al. | 364/200 |
| 4,412,281 | 10/1983 | Works | 371/10 |
| 4,525,839 | 6/1985 | Nozawa et al. | 371/10 |
| 4,638,465 | 1/1987 | Rosini et al. | 365/228 |

*Primary Examiner*—Robert L. Griffin
*Assistant Examiner*—Marianne Huseman
*Attorney, Agent, or Firm*—Frishauf, Holtz, Goodman & Woodward

[57] ABSTRACT

A data transmission system includes a data transmitter/-receiver connected to an ECR and a data processor. The transmitter/receiver receives data from the ECR and transmits the reception data to the data processor, and includes a storage means for storing the reception data as transmitted data after the reception data is transmitted. The data processor is connected to the transmitter/receiver and continuously processes data from buffer memories for storing data sent from the transmitter/receiver. The transmitter/receiver sends the transmitted data again after a power supply for the data processor is recovered.

11 Claims, 8 Drawing Sheets

DATA TRANSMISSION SYSTEM

BACKGROUND OF THE INVENTION

The present invention relates to a data transmission system for performing data transmission or reception between a personal computer and an ECR (Electronic Cash Register).

FIG. 1 shows a system configuration of a conventional data communication system. A plurality of ECR1, ECR2, . . . are connected to a personal computer (to be referred to as a PC hereinafter) through in-lines. In this data communication system, the PC is operated according to a flow in FIG. 2. The flow includes communications control processing (i.e., a protocol sequence) between the respective ECRs, i.e., ECR1, ECR2, . . . and a PC application sequence (more specifically, writing into floppy disk FDD coupled to the PC). When this flow is started, one unit data (i.e., one-block data) is received by an input buffer in interface I/F (step SA). If data is normally received, the PC responds to the ECR (step SB). Reception data is character-converted, and the resultant data is written in disk FDD (steps SC and SD). The CPU determines in step SE whether the reception data is the last block data. The data reception is repeated until the data is the last block data.

In the data communication system described above, at the end of the protocol sequence, the next processing (settlement processing after the last block data is sent out from the ECR side) is started at the ECR side. However, the transmitted data has not yet been written in the floppy disk at the PC side. In this case, if a power failure or a voltage drop occurs at the PC side at the end of the protocol sequence, the reception data is lost before it is completely written in the floppy disk Even if the PC requests retransmission of the lost data to the ECR side, the ECR has started the next processing (e.g., settlement processing). Therefore, the requested data cannot be sent from the ECR to the PC.

SUMMARY OF THE INVENTION

It is an object of the present invention to provide a data transmission system capable of properly receiving data from another electronic equipment even if a power failure occurs and of performing accurate data processing.

In order to achieve the above object of the present invention, there is provided a data transmission system comprising: a data transmitter/receiver for controlling to receive and transmit data, the data transmitter/receiver being provided with storage means for storing reception data and keeping the reception data as transmitted data even after the reception data is transmitted; a buffer memory, connected to the data transmitter/receiver, for storing data transmitted from the data transmitter/receiver; and a data processor for reading out the data from the buffer memory and processing readout data, wherein the data transmitter/receiver retransmits the transmitted data to the data processor in response to recovery of power of the data processor.

In the data transmitter/receiver of the data transmission system having the arrangement described above, the transmitted data for the data processor is stored in a capacity enough to allow the data processor to perform data processing. After the power failure is recovered, the storage content is sent again to the data processor. For this reason, as compared with the conventional system wherein the reception data is lost before it is completely processed by the data processor upon occurrence of a power failure and no special countermeasure is taken therefor, data reception at the data processor can be properly achieved, and accurate data processing can be performed.

DETAILED DESCRIPTION OF THE PREFERRED EMBODIMENT

A data communication system according to an embodiment of the present invention will be described with reference to FIGS. 3 to 10(B).

Figure 1:
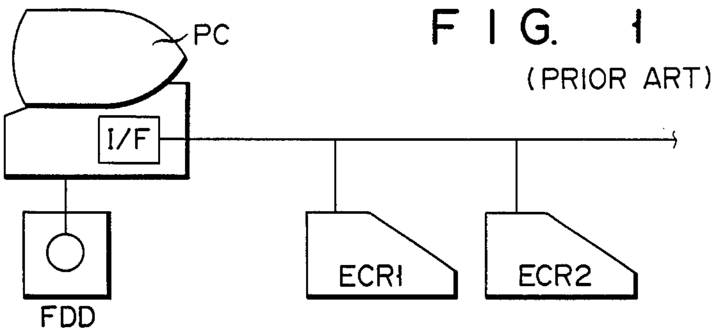
FIG. 1 (PRIOR ART)
FIG. 1 is a schematic diagram of a conventional data communication system.
Figure 2:
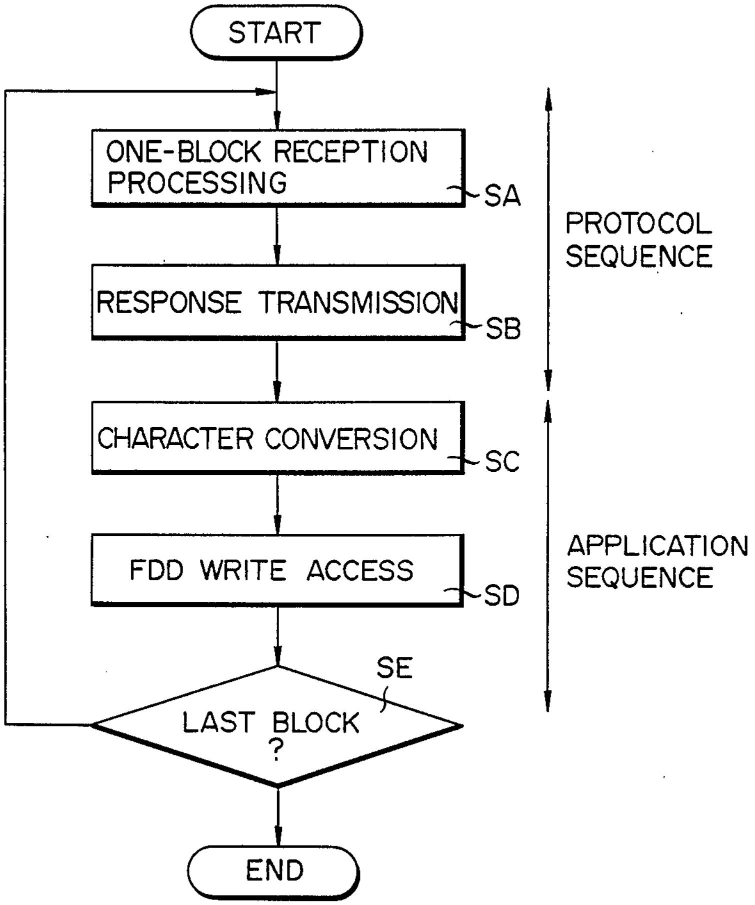
FIG. 2 (PRIOR ART)
FIG. 2 is a flow chart of programs executed by a conventional personal computer.
Figure 3:
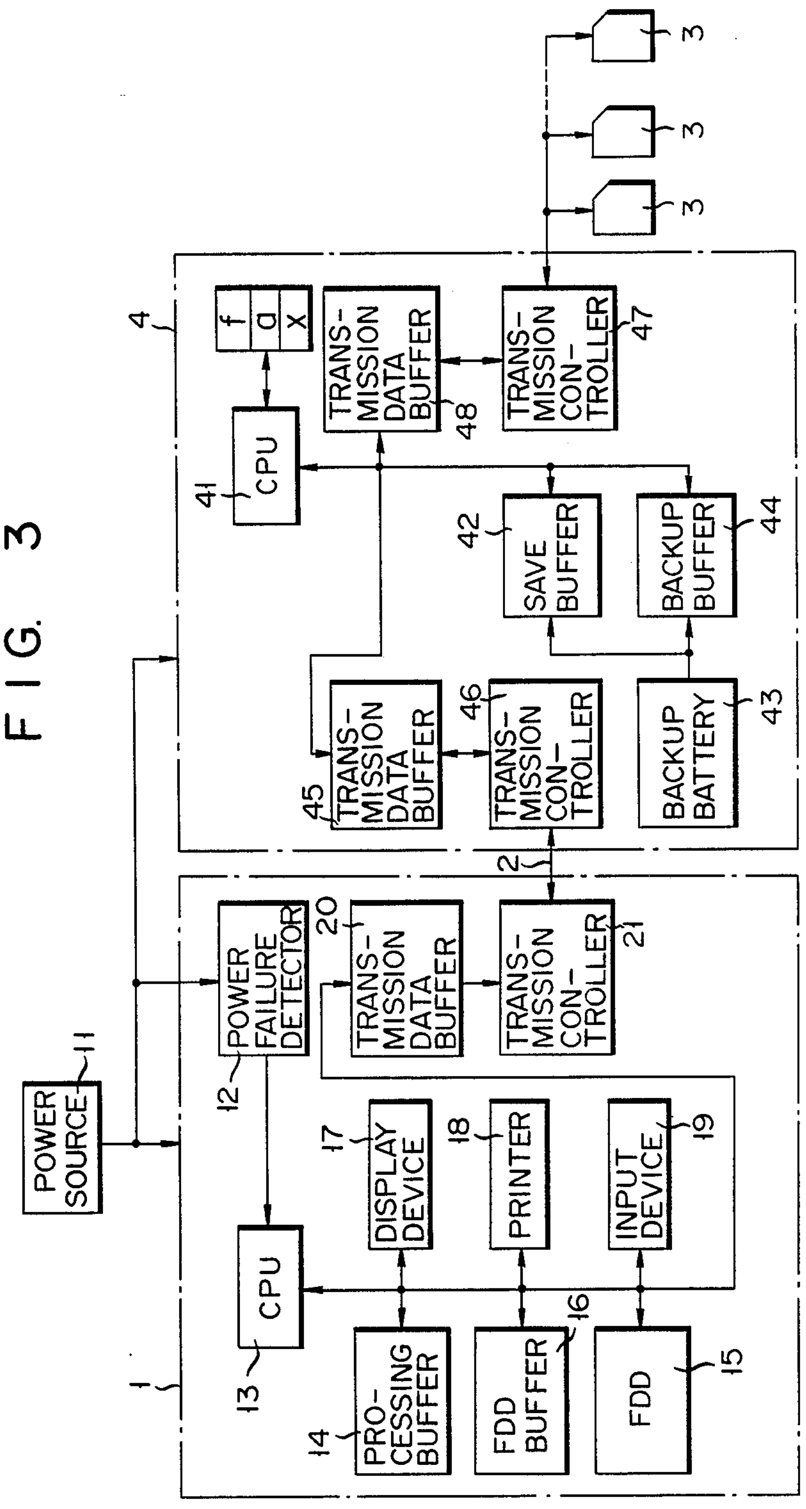
FIG. 3 is a schematic diagram of a data communication system according to an embodiment of the present invention.

FIG. 3 is a schematic system configuration of a data communication system to which the present invention is applied. Reference numeral 1 denotes a personal computer (data processor). A plurality of ECRs 3 are connected to computer 1 through in-lines 2. Data transmitter/receiver (i.e., a personal computer server) 4 independent of computer 1 and ECRs 3 is arranged between computer 1 and ECRs 3. Computer 1 is powered by AC power supply 11. An output voltage from power supply 11 is supplied to power failure detector 12. A detection signal from detector 12 is supplied to CPU (Central Processing Unit) 13. CPU 13 is connected to processing buffer 14 for temporarily storing data to be processed, FDD buffer 16 for temporarily storing data to be written in FDD (Floppy Disk Drive) 15, CRT display 17, printer (a thermal printer) 18, and input unit 19 with various keys. Computer 1 also includes transmission data buffer 20 as a communication interface and transmission controller 21.

ECR 3 is designed to perform general operations such as registration, inspection, and settlement. Departmental sales amount data or the like is transmitted from ECR 3 to server 4 and is then sent to computer 1 under the control of server 4.

Server 4 is a transmitter/receiver powered by power supply 11 for computer 1. Server 4 comprises a temporary storage (i.e., save buffer) 42 for temporarily storing data to be sent to computer 1 and backup buffer 44 which receives transmitted data in save buffer 42 and is constantly backed up by backup battery 43. Buffer 44 can store data, the capacity of which is enough to cause computer 1 to perform predetermined processing. Buffer 44 stores data prior to data processing. The latest transmitted data among data sent to computer 1 is stored in buffer 44. Buffer 42 is also backed up by battery 43. The content of buffer 42 is transferred to transmission buffer 45 under the control of CPU 41 and is sent to computer 1 through transmission controller 46. Data such as ACK, NAK, or setting data to be transmitted from computer 1 to ECR 3 is transferred to buffer 45 through controller 46 and fetched by CPU 41. Data held by buffer 44 is transferred to buffer 45 in response to reception of a predetermined command (a power failure restoration command) from computer 1. Data from ECR 3 is fetched by CPU 41 through transfer controller 47 and transmission data buffer 48. Data from server 4 is sent out to ECR 3 through buffer 48 and controller 47. Server 4 has various types of registers for communication control. Reference symbol f denotes a flag register for storing a flag representing the end of reception of one-block data when data sent from ECR 3 is last block data; a, a pointer for reading out the contents of save buffer 42 and backup buffer 44; and x, an address register.

The operation of the data transmission system in the data communication system in FIG. 3 will be described with reference to FIGS. 4 to 7.

OPERATION OF EMBODIMENT

Figure 4:
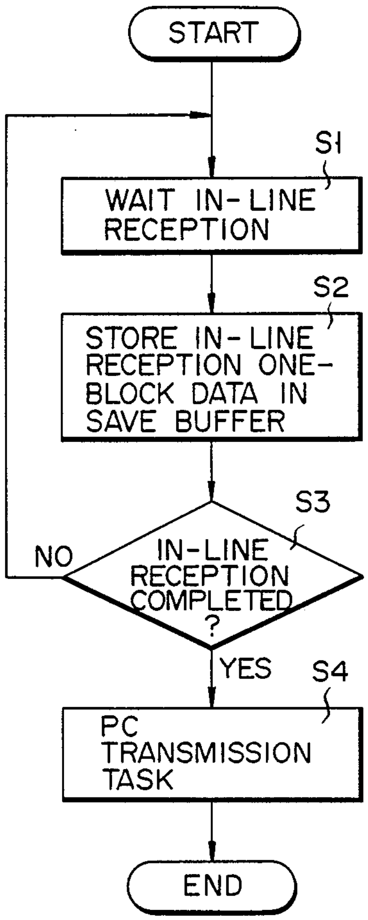
FIGS. 4 to 7 are flow charts showing the operation of a personal computer server according to the present invention.
Figure 5:
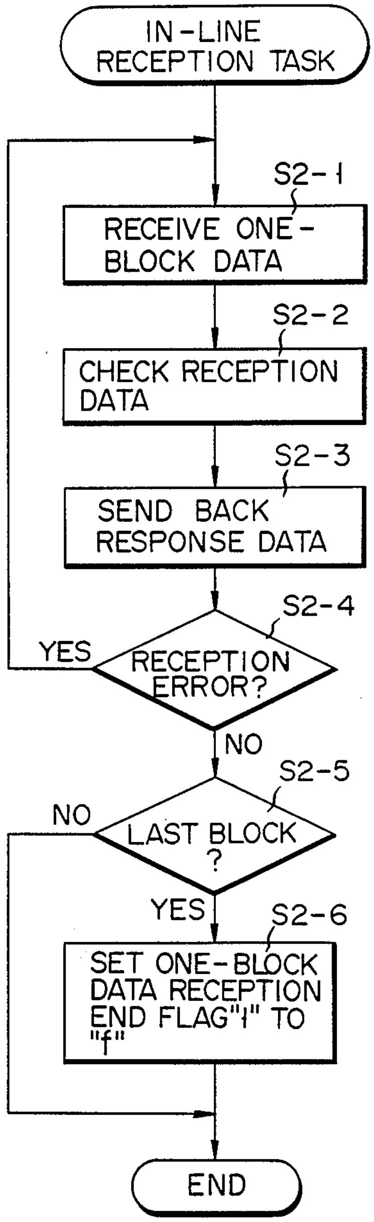
Figure 6:
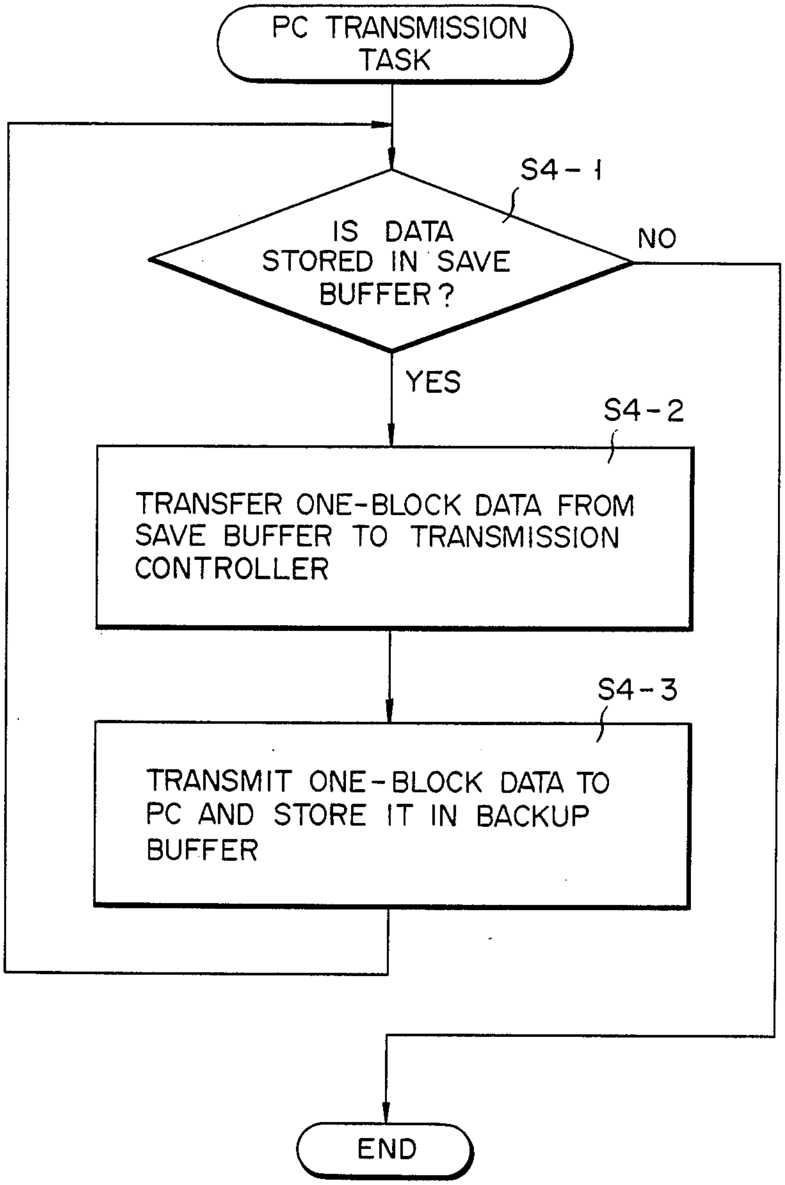

FIG. 4 is a flow chart for explaining server 4 when settlement data or the like is sent from ECR 3 to computer 1, i.e., when computer 1 is set in processing enable state 1 upon sending of a transmission request from ECR 3 to computer 1. In step S1, an in-line reception wait task is started. For example, if one-block data corresponding to sales data of one classification among all settlement data is detected in step S1, the in-line reception task in FIG. 5 is started. More specifically, upon reception of one-block data, an error check for reception data is performed (steps S2-1 and S2-2) A response representing the check result is sent to the ECR (step S2-3). If a reception error is detected in steps S2-1 and S2-2, signal NAC is sent to the corresponding ECR 3 in step S2-4. The flow then returns to step S2-1. One-block data sent again from the ECR is received, and the above operation is repeated. Assume that one-block data is normally received. Whether the reception data constituted by the predetermined number of blocks to be processed by computer 1 in one processing cycle represents last block data is determined in step S2-5. If NO in step S2-5, the flow in FIG. 5 is ended and returns to the main routine in FIG. 4. In step S2 of the main routine, one-block data received through the in-line is written in save buffer 42. Whether the one-block data reception end flag is set in register f is determined in step S3. Since NO in step S3, the flow returns from step S3 to step S2. The in-line reception task in FIG. 5 is restarted. Therefore, if server 4 normally receives data from ECR 3 in units of blocks, it writes each block in save buffer 42 according to the reception order. If the received one-block data is last block data, i.e., data constituted by a few blocks, the last block data is detected in step S2-5. This detection can be performed by detecting an identification code such as ETX or the like affixed to the last block data. In this case, one-block data reception end flag "1" is set in flag register f (step S2-6). Step S2 in FIG. 4 is executed, and the last block data is written in buffer 42. The flow advances to step S3. Since the one-block data reception end flag is set in register f, the personal computer transmission task is performed (step S4). This task is executed according to the flow in FIG. 6. Whether block data to be sent is present in save buffer 42 is determined in step S4-1. If YES in step S4-1, one-block data is read out from buffer 42 and transferred to buffer 45 so as to send the readout data to computer 1 (step S4-2). In step S4-3, one-block data is sent from buffer 45 to computer 1 under the control of controller 46. At the same time, one-block data read out from buffer 42 is transferred to and stored in buffer 44 (step S4-3). In this manner, data is sent from buffer 42 to computer 1 in units of blocks and the transmitted data corresponding to the storage capacity of buffer 44 is sequentially written therein. In this case, the oldest one-block data is shifted, and the newest transmitted data is stored, i.e. FIFO operation is performed. Therefore, backup buffer 44 always stores the newest transmitted data corresponding to its memory capacity. During execution of the personal computer transmission task, if data to be sent out is not left in buffer 42, the personal computer transmission task is ended, and at the same time the main routine in FIG. 4 is also ended.

In this manner, backup buffer 44 stores transmitted data of a few previous transmission cycles to the newest transmission cycle.

Figure 8:
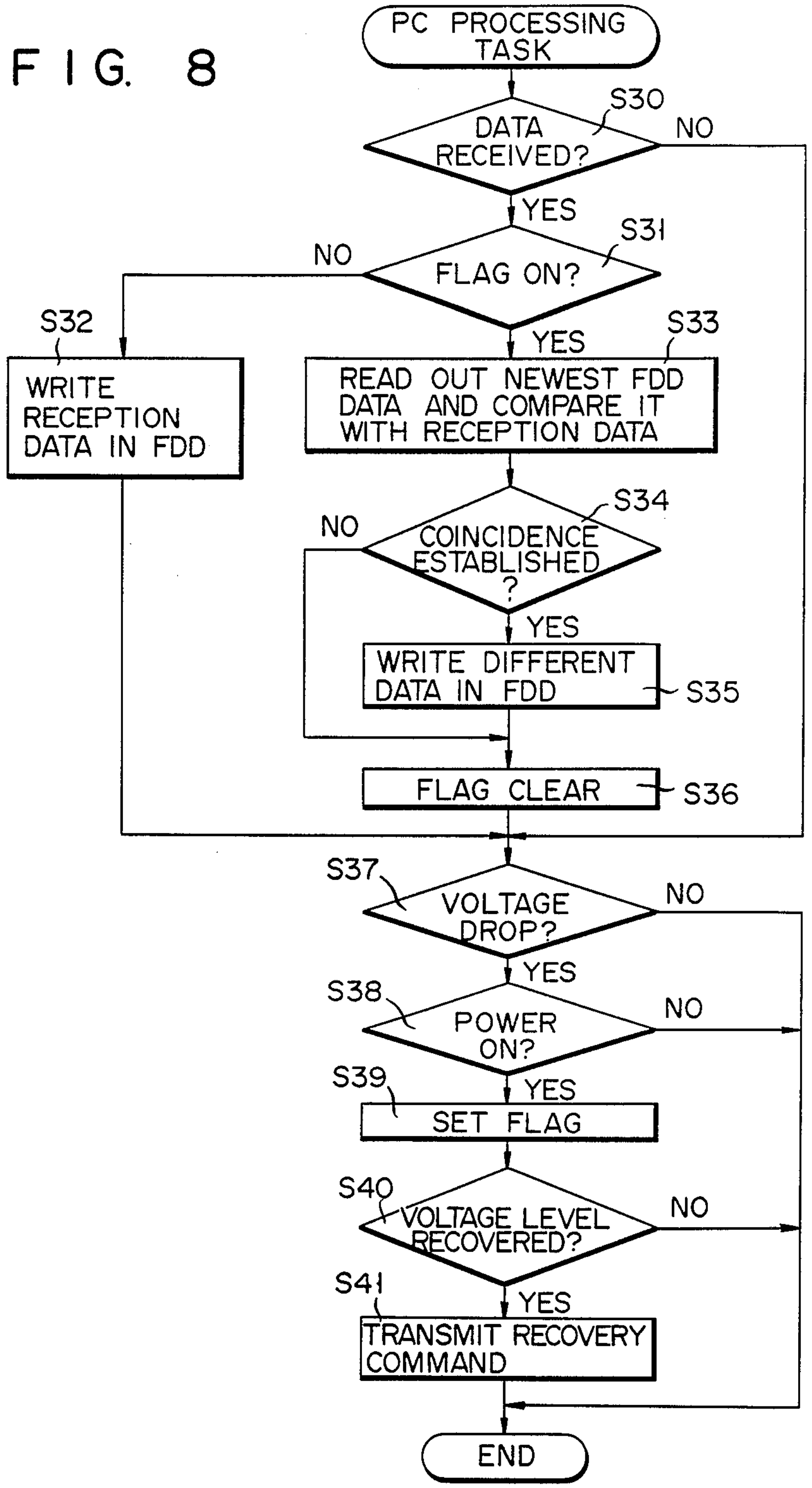
FIG. 8 is a flow chart for explaining the operations of the personal computer according to the present invention.

If a power failure or voltage drop does not occur in computer 1, processing according to the flow charts of FIG. 8 is performed through server 4. More specifically, upon reception of data from ECR 3 (step S30), whether a flag representing occurrence of a voltage drop is set is determined in step S31. If NO in step S31, data is written in FDD 15 through FDD buffer 16 under the control of CPU 13 in step S32. If the occurrence of a power failure or voltage drop in computer 1 is detected by power failure detector 12 in step S37, the state of a power switch (not shown) is determined in step S38. If the power switch is turned on and a voltage drop occurs, a processing error may occur. In this case, the flow advances to step S39 to set the flag. Thereafter, the flow advances to step S40. If the voltage level returns to the normal level, the recovery command is sent to server 4.

Figure 7:
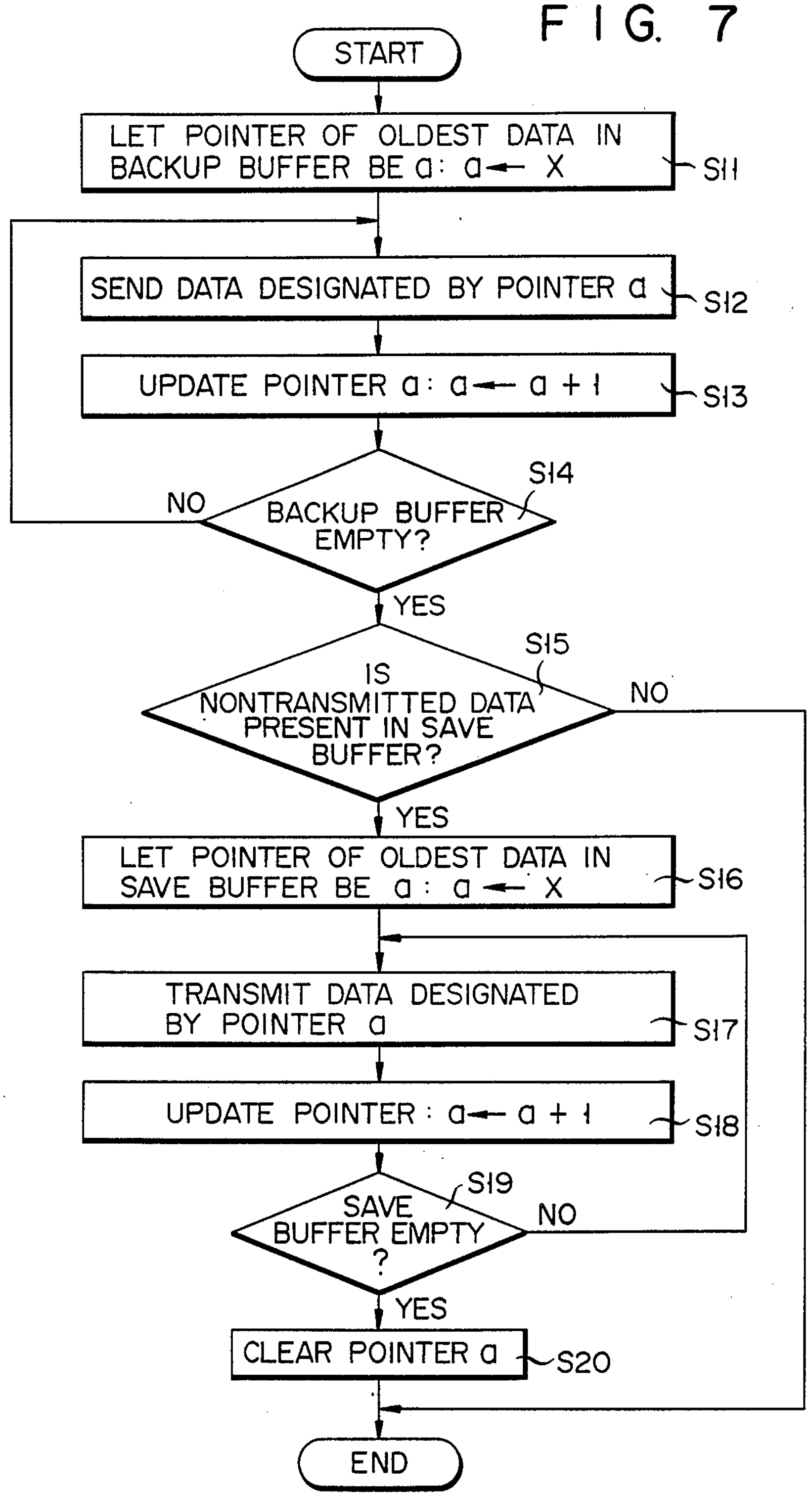

FIG. 7 shows a recovery command execution flow when server 4 receives the recovery command. Upon reception of the recovery command, an address at which the oldest data of buffer 44 is transmitted is read out from the x register and, readout data is transferred to pointer a. Data designated by pointer a is read out from buffer 44, is transferred to buffer 20, and is then sent from buffer 20 to server 4 (steps S11 and S12). The value of pointer a is incremented by one (step S13). Whether transmission of all data in buffer 44 is completed is determined in step S14 to check whether the value of pointer a is "N" (the end address of buffer 44). If the last data is determined not to have been sent out, the flow returns to step S12, and the next block data is sent out. When all data in buffer 44 is sent out, whether data is left in buffer 42 is determined in step S15. If YES in step S15, all the contents of buffer 44 are sent out, and then the contents (nontransmitted data) of buffer 42 are sent out. More specifically, the x register address at which the oldest data of buffer 42 is transmitted is transferred to pointer a (step S16). Data stored in buffer 42 and accessed by pointer a is read out and sent (step S17). The value of pointer a is incremented by one (step S18). Whether the value of pointer a represents the end address of buffer 42 is determined in step S19. If NO in step S19, the flow returns to step S17, and data transmission from buffer 42 continues. When all data is sent out from buffer 42, the content of pointer a is cleared in steP S20.

In this manner, when a power failure or the like occurs in computer 1, server 4 sends data again from buffer 44. Retransmission data includes data of a few previous transmission cycles to the newest transmission cycle. In addition, if nontransmitted data is present in buffer 42, such data is continuously sent from buffer 42 to computer 1. Data of the file in FDD 15 prior to a power failure is compared with data sent from server 4 after the recovery of the power failure. Data from server 4 which is not yet written in FDD 15 is determined as data lost by the power failure. Therefore, the transmission data can be stored as a perfect file without being influenced by a power failure.

Data from server 4 is written in FDD 15 according to the flow charts of FIG. 8, the processing of which is repeated at a predetermined time interval. If the flag representing that data has been received and a voltage drop has occurred is set (steps S30 and S31), the newest storage data corresponding to a predetermined memory capacity and stored in FDD 15 in step S33 is read out and compared with the reception data in step S34. If the readout data differs from the reception data, data has been lost because of a voltage drop. Therefore, the readout data and the reception data are written in FDD 15. The flag representing the voltage drop is cleared in step S36. If all data is accurately written in FDD 15 in step S34, the flow advances to step S36, and the above flag is cleared.

In this embodiment, in order to convert data and send converted data to computer 1, data prior to conversion is temporarily stored. After the converted data is sent to computer 1, the data prior to conversion is cleared from buffer 42, and the data transmitted to computer 1 is also cleared from buffer 44. Therefore, even if a power failure occurs during data conversion, such data can also be protected.

In the above embodiment, a nonvolatile memory (FDD 15) is arranged for the data processor to acquire data. In addition, a memory for accumulating the data in units of sales classifications may be arranged. In this case, the lost data is discriminated by a comparison between the data from the nonvolatile memory and retransmission data from the data transmitter/receiver (i.e., the saver). The data discriminated as the lost data is written in the nonvolatile memory, and at the same time the discriminated retransmission data in units of sales classifications is accumulated.

In the above embodiment, server 4 is arranged between computer 1 and ECR 3, and backup buffer 44 is arranged in the server. However, if a backup buffer is arranged in the ECR, a special device such as server 4 can be omitted, thus simplifying the system configuration.

In the above embodiment, the data backup operation for transmitting data from ECR 3 to computer 1 at the time of a power failure has been described. ECR 3 may be backed up at the time of a power failure when data is sent from computer 1 to ECR 3. In this case, data from computer 1 is temporarily stored in save buffer 42, and at the same time the data transmitted to server 4 is stored in backup buffer 44. Power failure detector 12 is arranged in ECR 3 to detect a power supply circuit after the power failure in ECR 3. Data is sent from buffers 44 and 42 after the power failure recovery is detected, thereby backing up the data.

Backup buffer 44 and save buffer 42 need not be arranged in the manner as in the above embodiment. Server 4 stores the reception data in a memory powered by a backup battery, and a pointer representing the data storage area of the transmitted data is updated every time data is sent out, thereby allowing descrimination between the reception data and the transmitted data.

Figure 9:
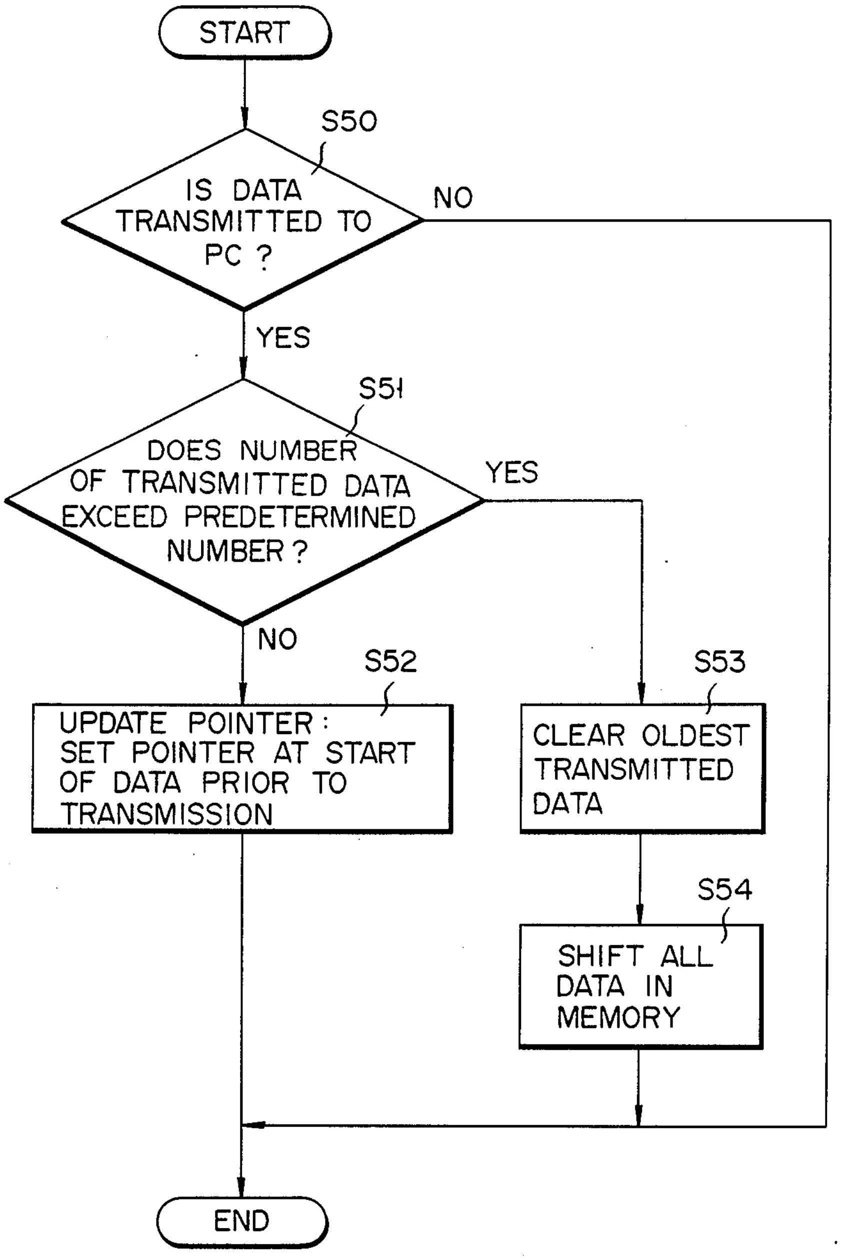
FIG. 9 is a flow chart for explaining pointer movement control according to the present invention.

This operation will be described with reference to the flow chart in FIG. 9.

Data received from ECR 3 is sequentially stored in a memory. The data transmission from ECR 3 to computer 1 is detected in step S50, and the flow advances to step S51. Whether the number of data corresponding to a value larger than that represented by the pointer position is smaller than a predetermined number is determined in step S51. If NO in step S51, the flow advances to step S52, and the pointer position is updated to the data start position prior to data transmission. However, if YES in step S51, the flow advances to step S53 and the oldest transmitted data is cleared so that all the nontransmitted and transmitted data contents are shifted by one block. In this case, the pointer is not updated.

Furthermore, instead of setting a pointer, a transmitted data flag may be set in correspondence with the transmitted data to perform the data comparison as described above.

Figure 10A:
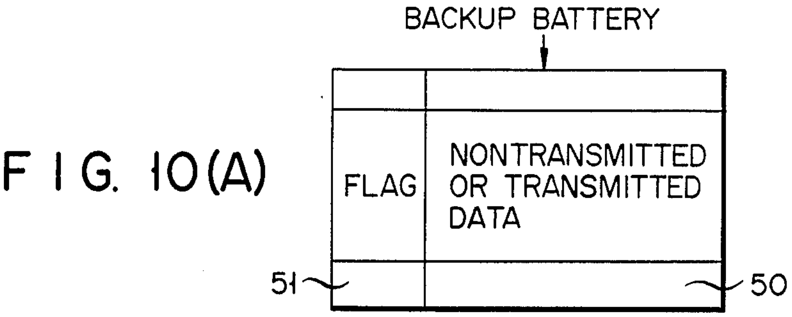
FIG. 10(A) is a data map of a memory used in the present invention.

In this case, the memory map of a memory is shown in FIG. 10(A). The memory has data memory area 50 for storing the nontransmitted and transmitted data, and flag memory area 51 for storing a flag corresponding to the transmitted data.

It should be noted that the above memory is powered by a backup battery.

Figure 10B:
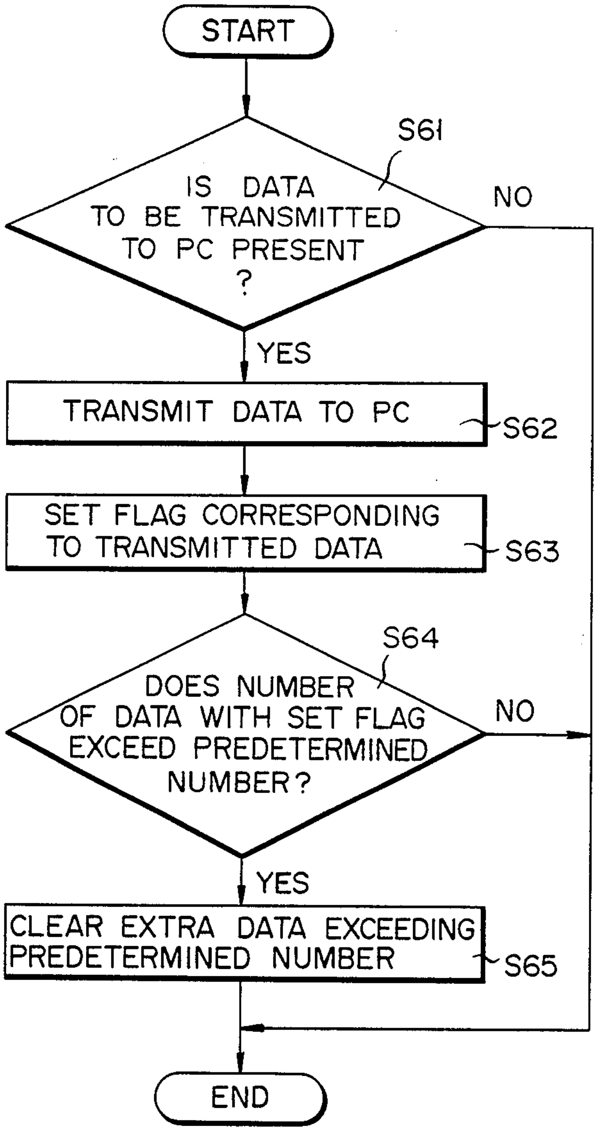
FIG. 10(B) is a flow chart for explaining transmission processing of the storage data from the memory in FIG. 10(A).

The reception data from ECR 3 is sequentially stored as the newest data in area 50. Processing in FIG. 10(B) is executed. Transmission of storage data to computer 1 is detected in step S61, and the flow advances to step S62. The flag representing the current data as the transmitted data is set in area 51. Thereafter, if the number of one-block data whose flags are set exceeds a predetermined number in step S64, the flow advances to step S65, and excessive older transmitted data is cleared.

What is claimed is:

1. A data transmission system, comprising:

a data transmitter/receiver for receiving data and transmitting reception data, said data transmitter/-receiver including storage means for storing the reception data and for keeping the reception data as transmitted data after the reception data is transmitted;

a buffer memory, connected to said data transmitter/-receiver, for storing transmitted data; and a data processor for reading out data from said buffer memory and processing readout data, said data processor being adapted to receive, through the buffer memory, the transmitted data again from said data transmitter/receiver in response to an operation of a power supply circuit upon recovery from an abnormal state to a normal state, said data transmitter/receiver further comprises:

a backup power supply circuit, connected to said storage means, for backing up the data stored in said storage means; and transmission control means, connected to said storage means and said data processor, for transmitting data read out from said storage means to said data processor, causing said storage means to store again the data as the transmitted data, and for transmitting the transmitted data again to said data processor in response to an abnormal voltage recovery signal obtained upon recovery from said abnormal state to said normal state of a power supply voltage associated with said data processor.

2. A system according to claim 1, wherein said storage means includes first storage means and second storage means, the first storage means being adapted to send the reception data to said data processor under the control of said transmission control means, and said second storage means being adapted to store the transmitted data.

3. A system according to claim 2, wherein said transmission control means comprises transmitting means for transmitting the transmitted data stored in said second storage means in response to the abnormal voltage recovery signal from said data processor and for transmitting nontransmitted data in said first storage means to said data processor.

4. A system according to claim 2, wherein said second storage means for storing the transmitted data has a memory capacity equal to or larger than that of said buffer memory.

5. A system according to claim 1, wherein said data processor includes: a nonvolatile memory; and discriminating means for comparing the processed data transmitted from said transmitter/receiver prior to generation of an abnormal voltage with the data transmitted from said transmitter/receiver in response to an abnormal voltage recovery signal and for discriminating nonprocessed data, said data processor being adapted to perform processing of the nonprocessed data.

6. A system according to claim 1, which further includes voltage abnormal state detecting means for detecting a decrease in a power supply voltage during processing of said data processor, said data processor being adapted to generate an abnormal voltage recovery signal when said voltage abnormal state detecting means detects the abnormal voltage after the power supply voltage is recovered to the normal state.

7. A system according to claim 6, wherein said abnormal voltage detecting means sets a flag representing a voltage drop upon detection thereof and discriminates a set/reset state of the flag when the power supply voltage restores the normal state.

8. A system according to claim 1, which further includes discriminating means, connected to said storage means, for discriminating the transmitted data from data prior to transmission which are stored in an identical memory area of said storage means.

9. A system according to claim 8, wherein said discriminating means performs discrimination by a pointer representing an area of the transmitted data every time data is sent from said storage means.

10. A system according to claim 8, wherein said discriminating means performs discrimination by a flag added to one of the data prior to transmission and the transmitted data.

11. A system according to claim 1, wherein said transmitter/receiver includes means for clearing the transmitted data such that a predetermined amount of transmitted data is always stored in said storage means.

* * * * *